Patented Aug. 12, 1930

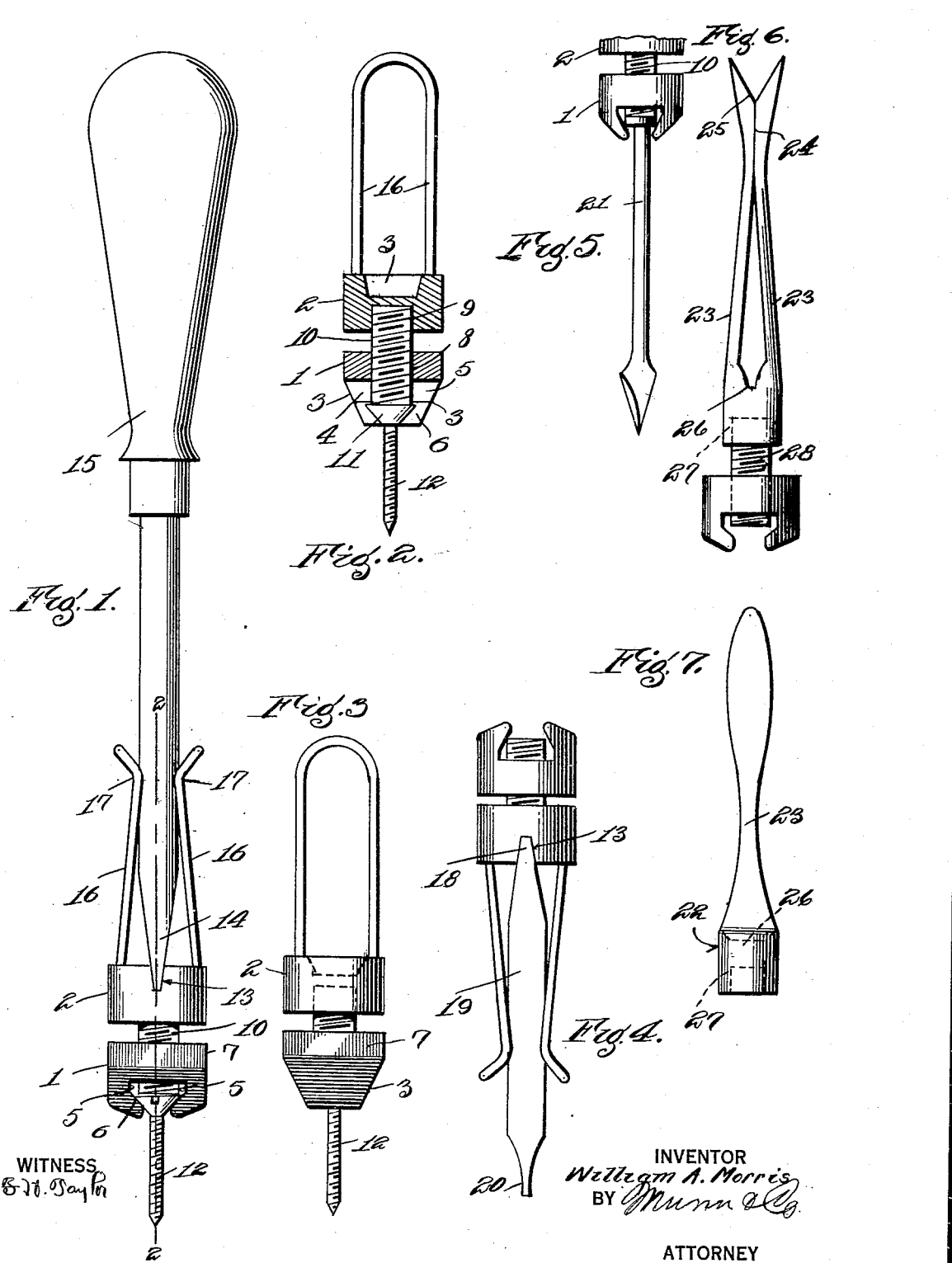

1,773,005

UNITED STATES PATENT OFFICE

WILLIAM A. MORRIS, OF EL RENO, OKLAHOMA

CHUCK

Application filed October 21, 1929. Serial No. 401,221.

This invention relates to chucks or similar clutching means, tools, fastening elements, etc., and is more particularly concerned with a chuck embodying the principles of a pressure or friction clutch operating by rotatory movement and designed to clutch a tool or fastener, without injury thereto and with force increasing with the resistance offered to operation of the tool or fastener.

One use, typifying the advantages of the chuck construction and operation, to which it may be put is the insertion of wood screws. In the insertion of these fasteners, particularly in hardwoods, the driver slot is usually engaged by a screw driving element and is more or less mutilated before the final driving turns are to be given the screw completely to insert it. These final turns require the greatest applied force and with the screw slot mutilated, it is difficult, if not impossible, to grip the sides of the slot with the usual screw driver and apply the final driving turns to the screw. The chuck of the present invention enables a screw to be readily inserted up to the final turn or turns without marring the driver slot therein, and is constructed quickly and easily to inclutch or release the screw or other element when this point is reached.

The chuck is designed to take standard driving elements such as ordinary or spiral driven screw drivers, and be rotatively operated thereby to clutch and impart rotation to screws or headed tools such as drill bits, etc., so that it constitutes a useful accessory for the tool kit. The chuck is formed to take and clutch headed shanked tools or fasteners with a wide range in head and shank sizes and is, therefore, of general utility in this respect as well as of especial advantage in the insertion of wood screws.

The invention consists in the constructions arrangements and combinations of parts hereinafter described and claimed and will be more clearly apparent from the following detailed specification which is to be read in conjunction with the accompanying drawings forming part thereof and in which:

Figure 1 is a view in side elevation of a chuck constructed in accordance with the present invention with an operating screw driver applied thereto and a wood screw clutched thereby.

Figure 2 is a transverse vertical sectional view through the chuck shown in Figure 1, with the wood screw held therein.

Figure 3 is a view in elevation of the chuck and screw, only, the screw driver being removed and the chuck being viewed in front elevation.

Figure 4 is a view in side elevation of the chuck, inverted, and holding a double ended screw driver bit in its screw driver clamps and socket for imparting the final turns to a screw previously inserted thereby.

Figure 5 illustrates the manner in which a headed drill bit or other similar tool may be held in the chuck.

Figure 6 is a view in side elevation of a chuck having a modified form of driver clasping follower head.

Figure 7 is a view in front elevation of the follower head, detached.

Referring to the drawings and particularly Figures 1, 2 and 3, it will be seen that the chuck of the present invention consists of two parts or heads, a lower receiving head 1 and an upper follower head 2. The lower receiving head 1 is in the form of a disk or plug of metal having the sides 3 of its base preferably converging downwardly as shown from an intermediate point to its lower edge with the bottom face transversely and centrally slotted as at 4 with upper parallel side walls 5 of maximum width for the maximum sizes of headed shanked tools or fasteners, the walls of the slot therebelow converging downwardly as shown at 6 to seat the under side of the heads of varying sizes below the maximum. The upper portion 7 of the receiving head is formed with a vertical bore 8 therein communicating with the slot 4 and centered relatively to the receiving head.

The follower head 2 which cooperates with the receiving head 1 is in the form of a metal disk or plug having a vertical threaded socket 9 in its lower face centrally thereof in which is seated the threaded upper end of a clutching stem 10 which depends therefrom and threads through the bore 8 of the receiving head 1 to engage with the face of its lower end, the top face of the head of a headed shanked tool or fastener inserted laterally through the slot 4, such for example, as the head 11 of the wood screw 12 shown in Figures 1, 2 and 3. The bore 9 and stem 10 extend vertically and preferably centrally of the head whose upper face at a point above the upper end of bore 9 and in line with said bore and stem is slotted as at 13 to take the bit of a driving element such as the bit 14 of the screw driver 15, shown in Figure 1. In order to retain the shank of the screw driver bit against slippage, a pair of resilient shank clasping arms 16 upstand from the top of the head 2 at the sides of the slot 13 flanking said slots and embracing the shank of the driver bit 14 therebetween adjacent their upper ends. In the form shown in Figures 1, 2 and 3, these clasps are in the form of U-shaped wires of spring material mounted in inverted position with their lower ends suitably fixed in the upper part of the head 2 and their upper bowed ends outturned as at 17, (Fig. 1) to provide opposed spring clasps.

The stem 10 may be formed integrally with and constitute an integral depending extension from the follower head, but preferably is separate therefrom, as shown, permitting a number of different stems 10 to be used with one follower head with their lower ends shaped to contact uniformly with the upper faces of the heads of headed shanked tools or fasteners of different form or contour.

It will be evident that, using the chuck shown in Figures 1, 2 and 3 for the insertion of a wood screw in, for example, hard wood, the head 11 of the screw 12 is inserted transversely through the slot 4 with its shank depending through the bottom of the slot, the stem 10 of the follower head being elevated in the slots sufficiently to permit insertion of the head. The driving bit 14 of a screw driver or other suitable means is then inserted in the slot 13 and the stem 10 rotated through the bore 8 to cause the face of its lower end to impinge and uniformly engage the top face of the screw head 11 forcing the latter downwardly against the converging inclined walls 6 of the groove and firmly clamping or clutching the screw head thereto. The point of the screw is now inserted in the wood into which it is to be driven and the shank of the screw driver is rotated, sufficient axial driving pressure being applied to start the threads. The flat face of the lower end of the stem 10 shown in Figure 2, for example, uniformly engages the flat upper face of the head 11 of the screw and does not mar its screw driver slot. The frictional clamping pressure of the end of the stem against the head of the screw increases in proportion to resistance of the turning of the screw so that slippage cannot occur. When the screw has been turned and inserted to the point where the lower end of the chuck engages the face of the wood in which the screw is inserted, a reverse turn of the screw driver will cause the stem 10 to release or unclutch the head of the screw and permit the chuck to be moved transversely to slide the head of the screw from the slot 4. Since this slot is at the lower end of the chuck during this operation, the screw will be driven into the wood up to the final turn or turns with its screw driver slot entirely unmarred. Subsequently, the final turn or turns may be given to the screw by means of a driver such as the screw driver 15 with the walls of the screw driver slot and the screw head affording ample grip for the sides of the screw driver in applying the final and the maximum force required for the final turns.

Conveniently, as shown in Figure 4, the screw driver slot 13 may be utilized to receive the upper bitted end 18 of a double ended driving bit 19 whose lower bitted end 20 may be inserted in the driver slot of the screw head for these final turns.

The form of the headed shanked element inserted in the slot 4 and clamped against the walls thereof by the follower stem may vary; it may be a screw fastener as shown in Figures 1–3, a drill or auger bit as shown at 21 in Figure 5 or any other type of shanked headed element operating through a rotary motion.

The form of the follower may be varied and the sizes of the follower and receiving heads may vary within a relatively wide range of dimensions for large and small work and headed shanked elements. In Figures 6 and 7, I have shown a modified form of follower head in which the head 22 is of relatively small diameter or dimension in cross section and is formed of resilient metal stock with integral spring arms 23 upstanding from its sides at its upper end and normally contracted to abut adjacent their upper ends as at 24, these upper ends being bevelled to provide a V-shaped mouth 25 into which the driving bit is inserted to spring the abutting edges 24 outwardly and permit the insertion of the lower end of the bit into the screw driver slot 26 formed in the upper face of the head 22 above the upper end of an axially alined threaded bore 27 into which the upper end of the follower stem 28 is inserted.

The various forms of the chuck parts described herein are intended as illustrative rather than restrictive of the invention, and it is to be understood that the chuck in its structural details may be varied to suit different conditions of manufacture and use in consonance with the spirit of the invention and the scope of the appended claims.

What I claim, therefore, and desire to secure by Letters Patent:

1. A chuck comprising a receiving head having its base laterally slotted with downwardly converging side walls and its upper portion bored to communicate with said slot, and a cooperating follower head having a rotatable clutching stem projecting therefrom and threading through said bore and having a socket to receive a driver for imparting clamping rotation to said stem and subsequent operating rotation to the chuck.

2. A chuck comprising a receiving head having its base transversely slotted with downwardly converging side walls and having its upper portion counterbored to communicate with said slot, and a cooperating follower head having a clutching stem projecting therefrom and threading through said bore and having an axially opposed slot therein to receive a driving bit for imparting rotation to said stem to clamp the head of a tool or fastener between its lower end and the walls of said slot, and for subsequent operating rotation of the chuck with the tool or fastener clamped therein.

3. A chuck for headed shanked elements comprising a receiving head having its base laterally slotted with downwardly converging side walls to receive the head of an element therebetween, and having a threaded bore in its upper portion communicating with said slot, and a cooperating follower head having a clutching stem projecting therefrom and threading through said bore to engage the face of the element head with its lower end and clamp said head against the converging slot walls, the end face of said stem and the top face of said element head being shaped for substantially uniform contact, and said follower head in axial alinement with said stem having means of engagement by and rotating connection with a rotatable driver.

4. A chuck for headed shanked elements comprising a receiving head transversely slotted on its under face to provide downwardly converging side walls and vertically counterbored at its top to communicate with said slot, and a follower head having a driver bit slot in its upper face with driver engaging clasps upstanding from opposite sides thereof, and having a clutching stem depending from its base in axial alinement with said slot and threading by rotation of said follower head through the bore in the receiving head to engage with the face of its lower end the upper face of an element head inserted in said slot to clamp the under side of said head against the walls of said slot and thereafter by continued rotation of said follower head bodily to rotate the follower and receiving heads and the clamped element in unison with clamping pressure increasing with resistance offered to rotation of said element.

5. A chuck for clamping and rotating against resistance shanked penetrating elements having driver slotted heads without injury to the slots therein consisting of a receiving head having a transverse slot in its under face to receive the element shank and downwardly converging walls to receive and support the slotted head thereof and having a counterbore therein communicating with said slot, and a follower head having a clamping stem extending therefrom and rotatable with said head to thread through said bore and engage with the face of its lower end the top face of said head to clamp the under face of said head against the converging walls of said slot, the reverse side of said follower head opposite to and in axial alinement with said stem having means of engagement by and rotating connection with a driver, said stem releasing and unclutching the slotted head of said element through reverse rotation.

6. A chuck comprising a disk having a threaded bore therein extending vertically downward from its upper face, and a slot traversing its under face communicating with the lower end of said bore and having downwardly converging side walls, and a second disk having a depending stem rotatable therewith and threading through said bore to extend its lower end into said slot, and having its upper face in axial alinement with said stem provided with means of engagement by and rotating connection with a driver.

7. A chuck for screw fasteners comprising a disk having a threaded bore therein extending vertically downward from its top face and a slot traversing its bottom face to receive the shank of the screw and having downwardly converging side walls to receive the head of the screw, and a second disk having a threaded stem depending centrally therefrom and rotatable therewith to thread through the bore of the first disk and engage and clamp the head of an inserted screw fastener against the walls of its slotted under face, the upper face of said second disk in line with said stem being traversed by a slot to receive the driving bit of a screw driver, said slot being flanked by upstanding driver clasping arms.

8. A chuck comprising means for receiving the head of a screw to be driven, a stem operable on said means to clamp the head of the screw, and means to attach the stem to a screw driver for application of the turning thrust to the stem.

9. A chuck comprising receiving means to receive the head of a screw to be driven, clamping means carried by the receiving means, and attaching means for clasping the clamping means to a screw driver for utilizing the initial turning of the screw driver to clamp the screw head and the subsequent turning of the screw driver to drive the screw.

WM. A. MORRIS.